(12) United States Patent
Hathaway et al.

(10) Patent No.: US 9,400,864 B2
(45) Date of Patent: Jul. 26, 2016

(54) SYSTEM AND METHOD FOR MAINTAINING SLACK CONTINUITY IN INCREMENTAL STATISTICAL TIMING ANALYSIS

(71) Applicant: INTERNATIONAL BUSINESS MACHINES CORPORATION, Armonk, NY (US)

(72) Inventors: David J. Hathaway, Underhill, VT (US); Jeffrey G. Hemmett, St. George, VT (US); Kerim Kalafala, Rhinebeck, NY (US); Debjit Sinha, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 14/326,488

(22) Filed: Jul. 9, 2014

(65) Prior Publication Data

US 2016/0012173 A1    Jan. 14, 2016

(51) Int. Cl.
*G06F 9/455* (2006.01)
*G06F 17/50* (2006.01)

(52) U.S. Cl.
CPC ........ *G06F 17/5081* (2013.01); *G06F 17/5031* (2013.01); *G06F 2217/84* (2013.01)

(58) Field of Classification Search
USPC ........................................... 716/113
See application file for complete search history.

(56) References Cited

U.S. PATENT DOCUMENTS

| 7,428,716 | B2 | 9/2008 | Visweswariah |
| 8,302,049 | B2 | 10/2012 | Musante et al. |
| 2005/0066296 | A1* | 3/2005 | Visweswariah ................... 716/6 |
| 2012/0047477 | A1* | 2/2012 | Kalafala et al. ............... 716/108 |

* cited by examiner

*Primary Examiner* — Eric Lee
(74) *Attorney, Agent, or Firm* — Law Offices of Ira D. Blecker, P.C.

(57) ABSTRACT

A method and a system of maintaining slack continuity in incremental statistical timing analysis includes using a computer to forward propagating both scalar and statistical arrival times in a single timing environment; computing for a timing end point one or more projected statistical slack value; computing a scalar reverse engineered required arrival time from the projected statistical slack value; back propagating the scalar reverse engineered required arrival time using scalar delay values, measuring a resulting slack and performing a redesign based on the reverse engineered scalar required arrival time and resulting slack; and incrementally re-executing selected steps to re-compute a new scalar reverse-engineered required arrival time and new resulting slack.

13 Claims, 12 Drawing Sheets

SSTA AT propagation

SSTA RAT propagation in *data path*

Resulting slacks in data path

SYSTEM AND METHOD FOR MAINTAINING SLACK CONTINUITY IN INCREMENTAL STATISTICAL TIMING ANALYSIS

FIELD OF THE APPLICATION

The present application generally relates to the field of Design Automation of semiconductor VLSI chips, and more particularly, to a method and a system providing an efficient system and method for maintaining slack continuity in incremental statistical timing analysis.

BACKGROUND

An objective of a conventional statistical static timing analysis (SSTA) is to prevent circuit limited yield (CLY) losses by accounting the effects of parametric variability upon switching time distributions of various signals within a digital circuit. A conventional SSTA can be performed at a transistor level or at a gate level, using pre-characterized library elements including those at higher levels of abstraction for complex hierarchical chips.

SSTA algorithms are known to operate by way of a first levelizing the logic structure and breaking any loops in order to create a directed acyclic graph (timing graph). Modern designs can often contain millions of placeable objects, with corresponding timing graphs having millions or tens of millions of nodes. For each node, a corresponding arrival time (AT), a transition rate (slew), and a required arrival time (RAT) are computed for both rising and falling transitions as well an early and late mode analysis. Each value can be represented in general as a distribution, i.e., using a first-order canonical form, wherein timing quantities are represented as functions of underlying sources of variation, as described e.g., in U.S. Pat. No. 7,428,716 to Visweswariah, of common assignee. The arrival time (AT) distribution represents the latest or earliest time at which a signal can transition due to the entire upstream fan-in cone. Similarly, the required arrival time (RAT) distribution represents the latest or earliest time at which a signal must transition due to timing constraints in the entire down stream fan-out cone.

ATs are propagated forward in a levelized manner, starting from a design primary input asserted (i.e., user-specified) arrival times, and ending at either the primary output ports or the intermediate storage elements. In single fan-in cases, $$AT\ sink\ node = AT\ source\ node + delay\ from\ source\ to\ sink.$$

Whenever multiple signals merge, each fan-in contributes a potential arrival time computed as AT sink (potential)=AT source+delay, making it possible for the maximum (late mode) or minimum (early mode) of all potential arrival times to be statistically computed at the sink node. Typically, an exact delay function for an edge in a timing graph is not known, but instead only the range of possible delay functions can be determined between some minimum delay and a maximum delay. In this case, maximum delay functions are used to compute the late mode arrival times and minimum delay functions used to compute the early mode arrival times.

A timing test (e.g., setup or a hold check) involves a comparison of arrival times in order to determine if the proper ordering relationships between the corresponding signals are satisfied. Such a comparison of AT values produces a quantity known as slack, which when positive in sign indicates that the timing test has been satisfied (and the margin thereof), whereas a negative value indicates a failing test and potential problem.

In an SSTA, when multiple incoming edges merge at a common node, the resulting value is computed by a statistical maximum or minimum operation—generally, the result of which can not be equal to any of the operands. The above applies for all quantities propagated in a block based manner, including arrival times, required times, and slew values. Furthermore, even though an SSTA computes timing values such as slack in a canonical fashion (i.e., as functions of underlying sources of variation), optimization programs typically prefer to deal with scalar quantities, and hence canonicals are sampled by projecting to a worst-case corner in order to create a scalar representation.

Whereas in a deterministic (e.g., single corner) timing, it is guaranteed that the slacks will be continuous along at least one critical path in a design. In an SSTA, due to the aforementioned statistical min/max operations and the projection of canonicals to a worst-case corner, the slack continuity can no longer be guaranteed. In view of the lack of slack continuity, the following situations can arise: it is possible to have an end point (setup or hold test) with failing projected slack, but whose upstream logic all have slack values which are greater (i.e., either less negative, or even positive) as compared to the failing end point.

Further, it is possible to have an intermediate node within the timing graph with a negative slack which feeds end point that all have positive slack values.

To illustrate the above considerations, a small exemplary circuit is shown in FIG. 1 that includes a gate BOX101 having inputs Data1 and Data2 outputted into BOX102 which has as input the output of BOX101, and a second input Data3. BOX104 is connected to a clock attached to an inverter and to a second input provided with an output of BOX2.

FIG. 2 illustrates a corresponding levelized timing graph corresponding to the exemplary circuit of FIG. 1. Each directed edge of the timing graph represents an electrical transition from either a source to sink pin of a wire, or a transition through a circuit element such as an AND gate, Buffer, Latch, and the like. Each node within the timing graph represents either an input or an output pin within the illustrated exemplary circuit. As an example, a simple Buffer is represented by two nodes (one for the input pin and the other for the output pin) connected by a directed edge which represents an electrical transition from the input to the output of the Buffer.

FIG. 3 shows the forward propagation of SSTA late mode arrival times using prior art techniques for statistical timing. In the example, it is assumed that there exist two global statistical sources of variation ("A" and "B) in addition to independently random ("R"). For the purpose of simplicity, as shown in FIG. 3, all the wire segments (shown in dashed lines) are assumed to have a uniform delay value of 5+1ΔB, and all cell segments (shown by solid lines) themselves similarly having a uniform statistical delay value (5+1ΔA). It is assumed that the primary inputs DATA_1, DATA_2, DATA_3 and CLOCK have asserted arrival times, with values as shown in FIG. 3.

FIG. 4 illustrates the backward propagation of SSTA required arrival times, again using well-known prior art methods. For purpose of simplicity, only the data path is shown and it assumed that the required arrival time at BOX104/D is to be equal to the arrival time previously computed at BOX104/C (i.e., assuming a setup test between BOX104/D and BOX104/C, with zero setup timing and cycle adjust).

FIG. 5 shows resulting statistical slack values computed as statistical RAT—statistical AT (assuming a late mode calculation).

FIG. 6 illustrates the resulting 3-sigma projected slack values obtained by projecting each canonical slack to a 3-sigma corner which minimizes the result. For example, at the test location BOX104/D, a canonical slack of 5+0.9ΔR+ 0.6ΔA+0.5ΔB, is projected to a worst case 3-sigma corner as follows:

Projected slack=5+3*(0.9+0.6+0.5)=5−3*(2)=−1

Generally, timing-driven optimization programs work by identifying design elements such as nets and cells with failing slacks and applying transforms to correct timing problems. Such transforms are typically applied in an incremental fashion in such manner that slacks are updated in response to each change (or collection of changes), allowing the timing-driven optimization program evaluate effectiveness of various changes and potentially select from among a range of possible solutions depending on which alternative improves the slack most effectively within given budget constraints such as available power, area, and wiring resources. However, in an SSTA, due to the aforementioned sources of slack discontinuity, timing-driven optimization programs can have difficulties to identify proper locations for applying transforms, and for evaluating the effectiveness thereof.

Still referring to FIG. 6, while a negative 3-sigma projected slack exists at BOX104/D, the negative value of slack only appears with one edge upstream (e.g., on BOX102/Z), whereas all nodes further upstream of BOX102/Z show positive 3-sigma projected slack. Hence, a timing-driven optimization program which uses a negative 3-sigma projected slack as a transform driver can have trouble selecting a location to apply a fix. For example, a transform which looks for negative 3-sigma projected slack at the input of combinatorial boxes in order to select candidate locations for applying transforms would fail to find any such candidates based on 3-sigma projected slack values shown in FIG. 6. Hence, the negative 3-sigma projected slack at BOX104/D can remain in post-optimization (i.e., an optimization program which works in the manner described above would fail to fix such a timing violation identified by SSTA).

Conventional techniques perform timing-driven optimization for SSTA closure using a projection-based form of the statistical min/max operation that ensures that the result is always equal to one of the operands. However, a key drawback of the prior art method is that the proper statistical properties (e.g., the variance) of the result are no longer maintained, and hence the SSTA based on projection-based min/max is considered to be insufficient for timing closure of high-performance digital systems.

In another prior art technique, slacks are periodically transferred between a separate statistical and a deterministic (single-corner) timing environment, followed by an optimization step based on transferred slacks in the deterministic environment. However, a key drawback of the prior-art periodic slack transfer method is that the transferred slack values are not updated incrementally (i.e., statistical and deterministic runs are made separately and do not simultaneously react to design changes), and hence can quickly go stale.

In summary, in a high performance chip design, there is a desire to incrementally re-compute the statistical slack values while maintaining slack continuity properties which are critical for timing-driven optimization programs.

Accordingly, a method and a system capable are provided to maintain slack continuity in incremental statistical timing analysis.

SUMMARY

In one aspect of the disclosure, an embodiment provides a method that addresses the slack discontinuity problem in-situ, and incrementally transfers a projected statistical value to a deterministic timing graph, wherein the transferred slack values are propagated to a deterministic graph maintaining slack continuity and representation of a worst projected statistical slack.

In another aspect, a method of maintaining slack continuity in an incremental statistical timing analysis that includes: a) using a computer, forward propagating both scalar and statistical arrival times in a single timing environment; b) computing for at least one timing end point at least one projected statistical slack value; c) computing at least one scalar reverse engineered required arrival time from the at least one projected statistical slack value; d) back propagating the scalar reverse engineered required arrival time using scalar delay values, and measuring a resulting slack; e) performing a redesign based on the reverse engineered scalar required arrival time and resulting slack; and f) incrementally re-executing steps a) to e) to re-computing a new scalar reverse-engineered required arrival time and new resulting slack.

In another aspect, an embodiment evaluates the re-design based on the incrementally re-computed new reverse-engineered scalar required arrival time and new resulting slack, and evaluates the redesign based on the incrementally re-computed new reverse-engineered scalar required arrival time and new resulting slack.

In yet another aspect, an embodiment applies to the timing different rising and falling delays, slews, arrival times and required applied times, and statistical timing runs applied to multiple clock domains.

In a further aspect, a scalar projected statistical slack value is computed based on one or more worst-case projection, root-sum-square projection, or any combination thereof.

BRIEF DESCRIPTION OF THE DRAWINGS

The accompanying drawings, which are incorporated herein and which constitute part of the specification, illustrate the presently preferred embodiments of the application which, together with the general description given above and the detailed description of embodiments given below serve to explain the principles of the application.

DETAILED DESCRIPTION

The present application and various features, aspects and advantages thereof are explained more fully with reference to the non-limiting embodiments that are illustrated in the accompanying drawings and detailed in the following description.

Figure 1:
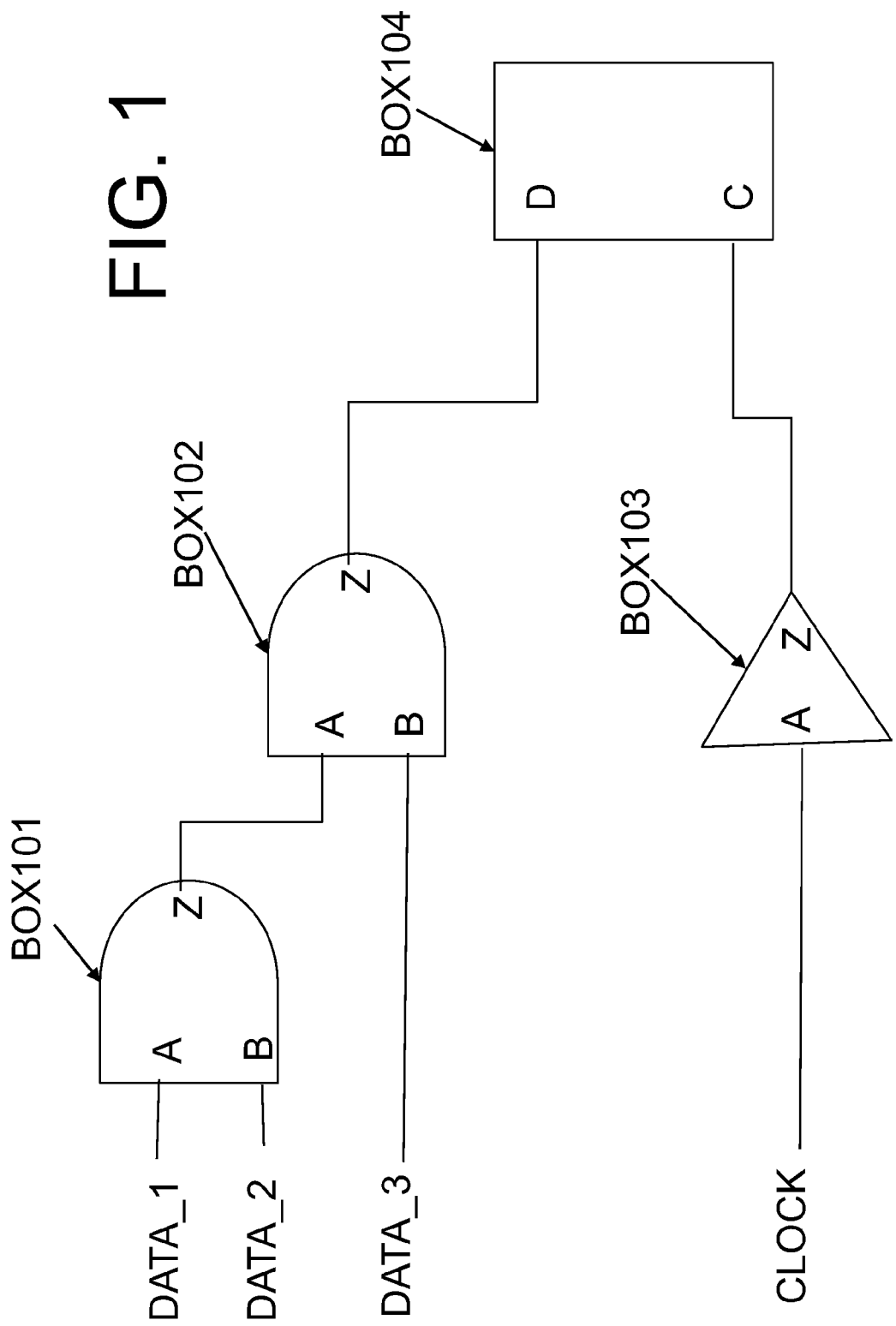
FIG. 1 shows an exemplary conventional circuit.
Figure 2:
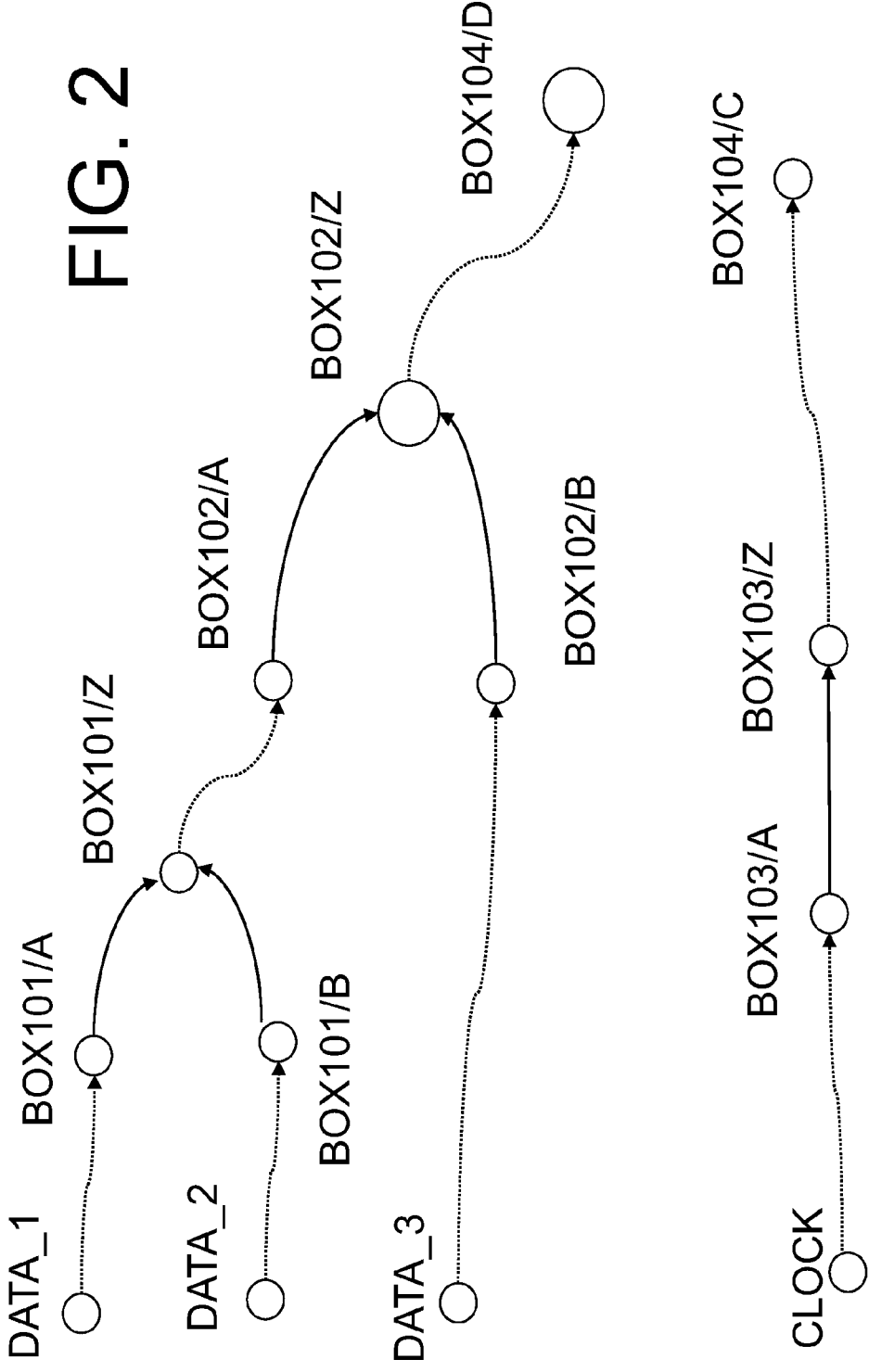
FIG. 2 illustrates a timing graph representation of the exemplary circuit.
Figure 3:
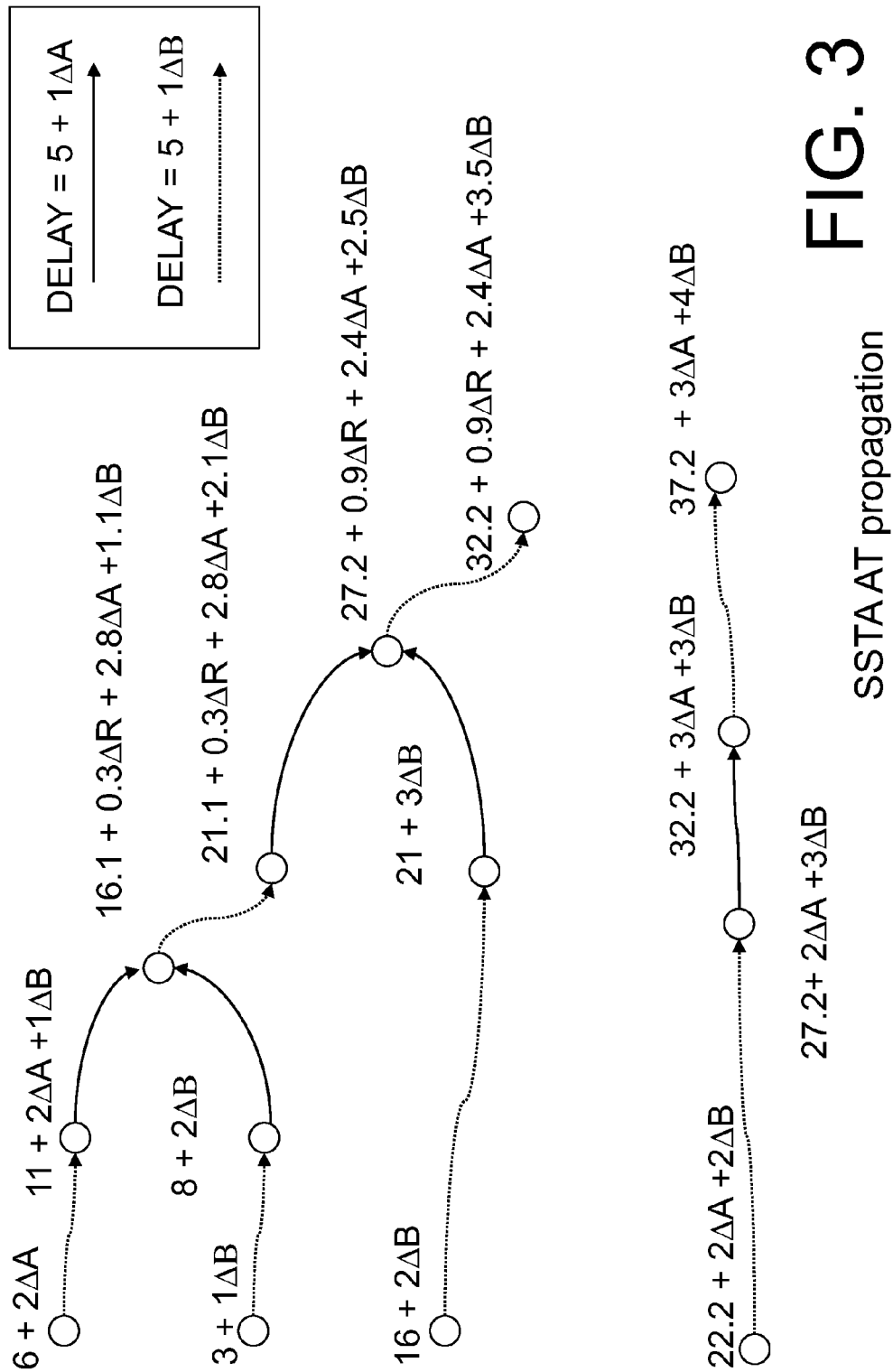
FIG. 3 depicts a forward propagation of statistical arrival times for the exemplary circuit.
Figure 4:
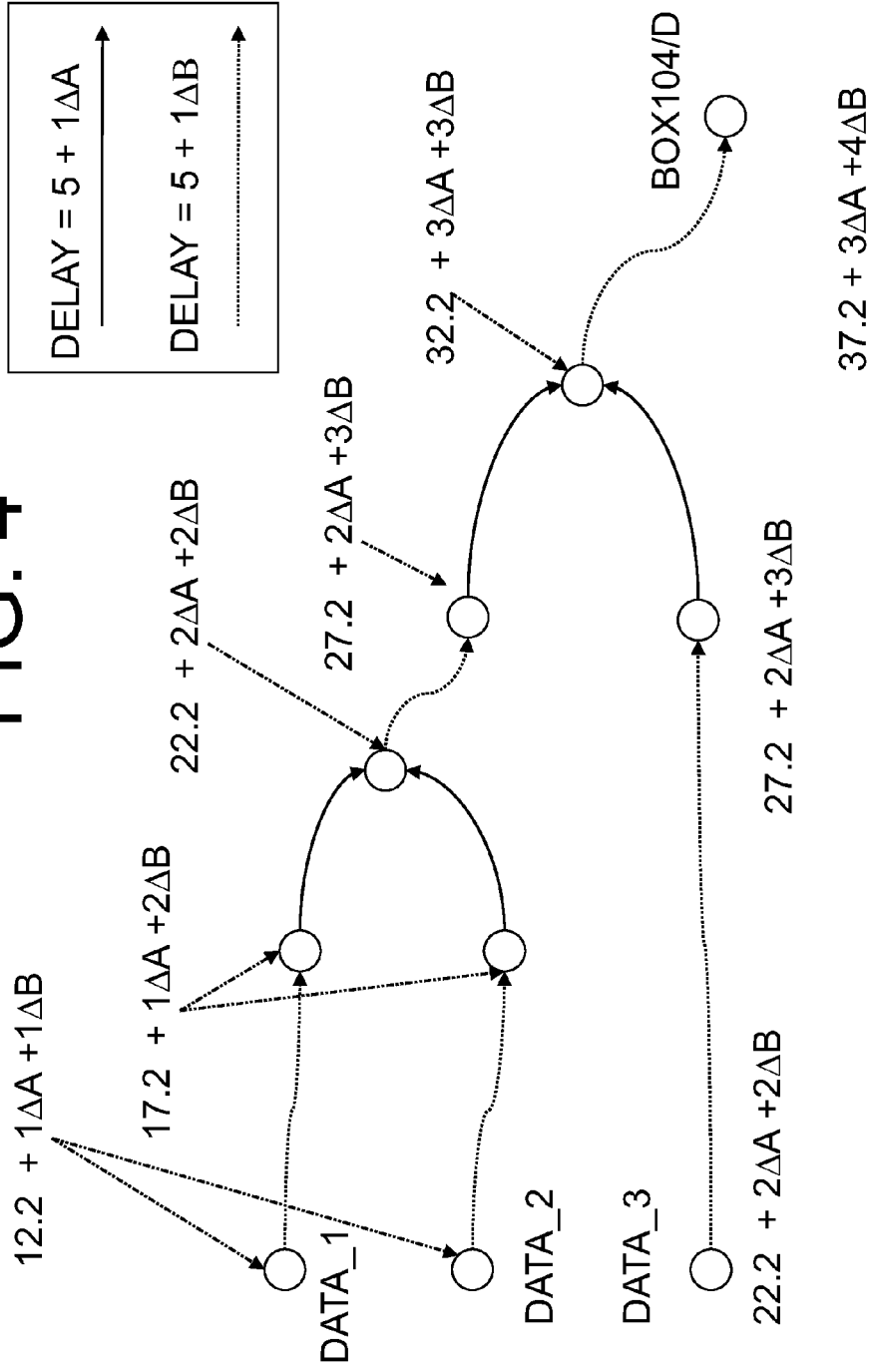
FIG. 4 illustrates backward propagation of statistical required arrival times for the data path of the exemplary circuit.
Figure 5:
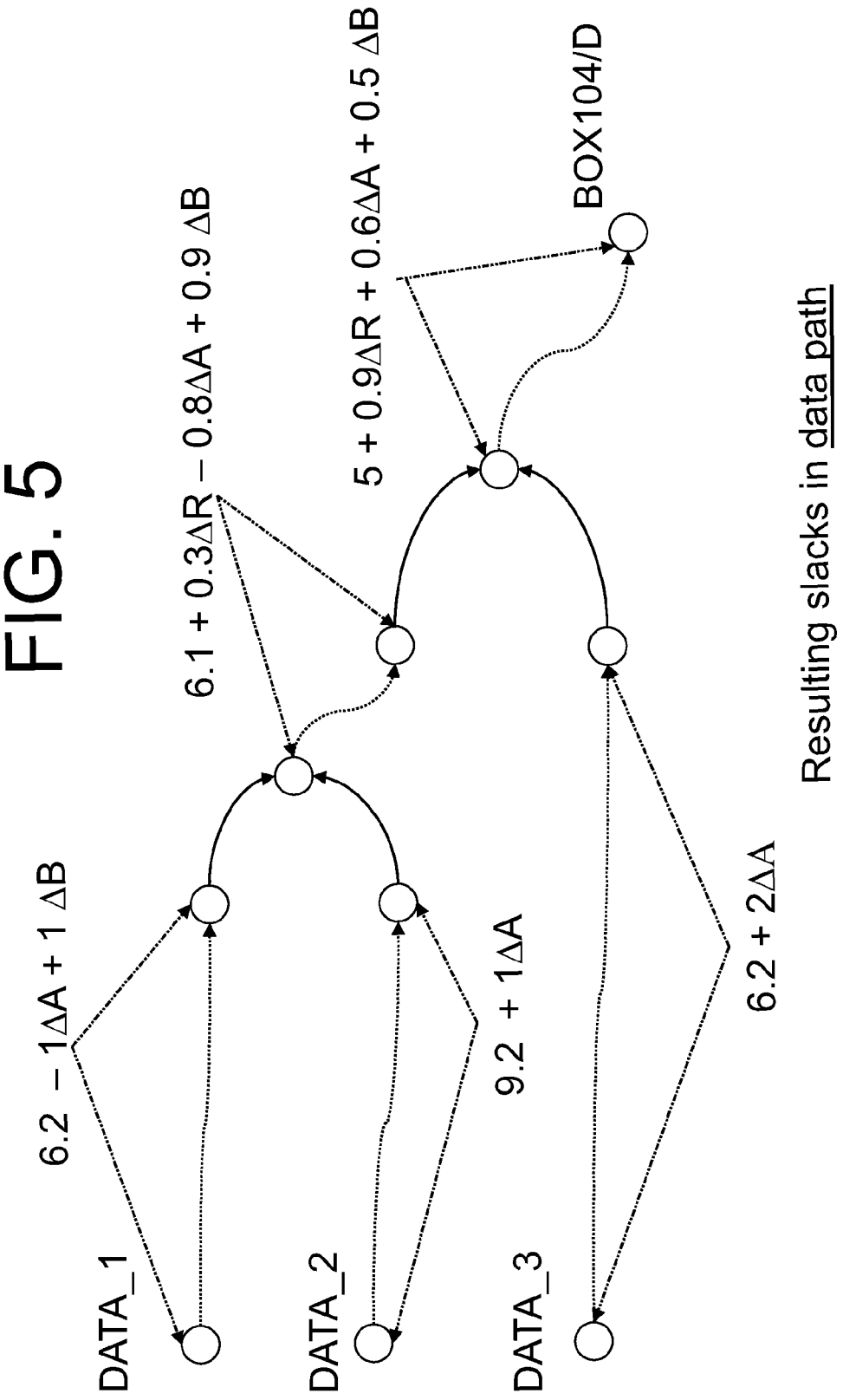
FIG. 5 illustrates resulting statistical slacks for the data path of the exemplary circuit.
Figure 6:
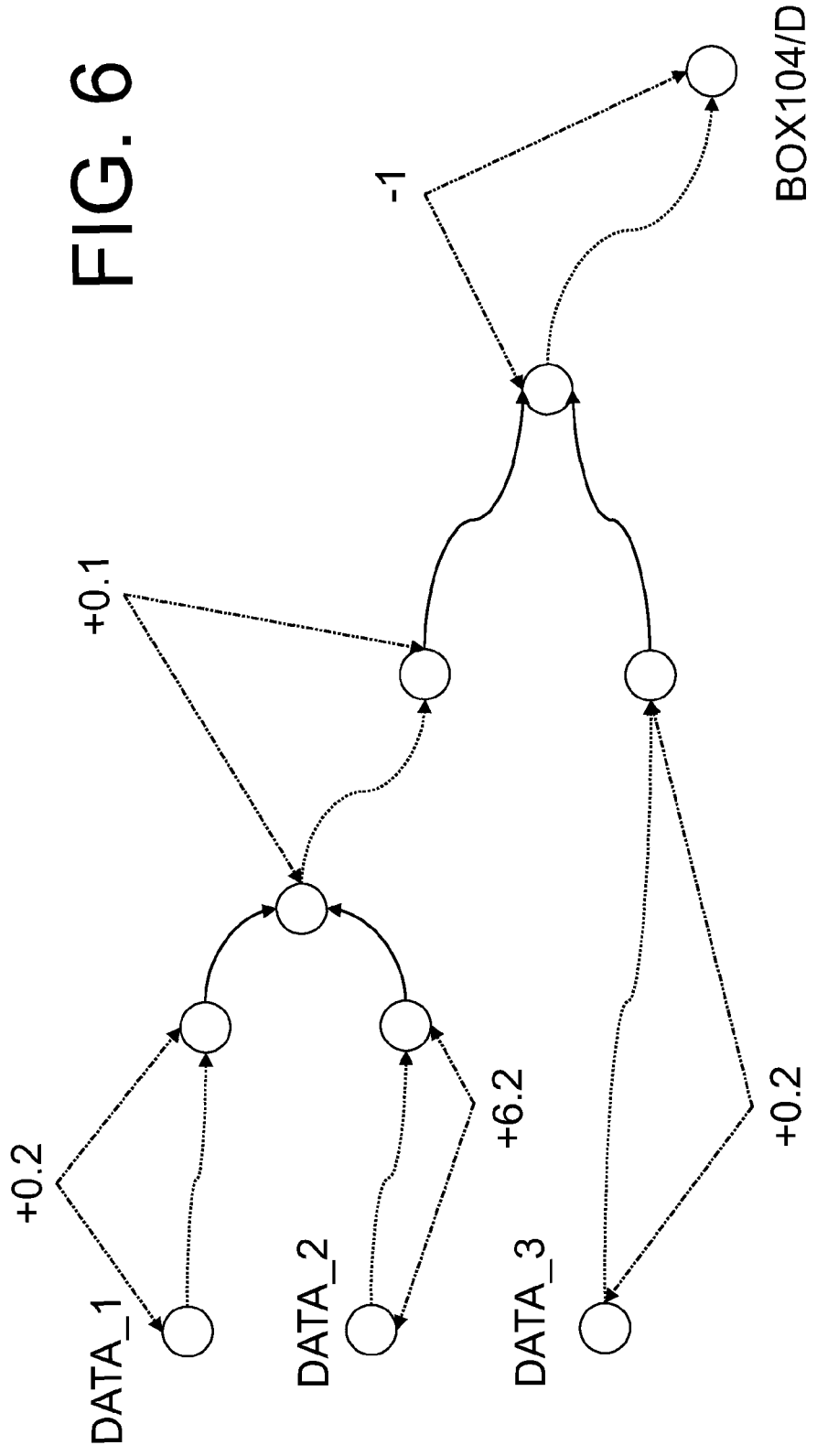
FIG. 6 illustrates slack values projected to a worst 3-sigma corner for the data path of the exemplary circuit.
Figure 7:
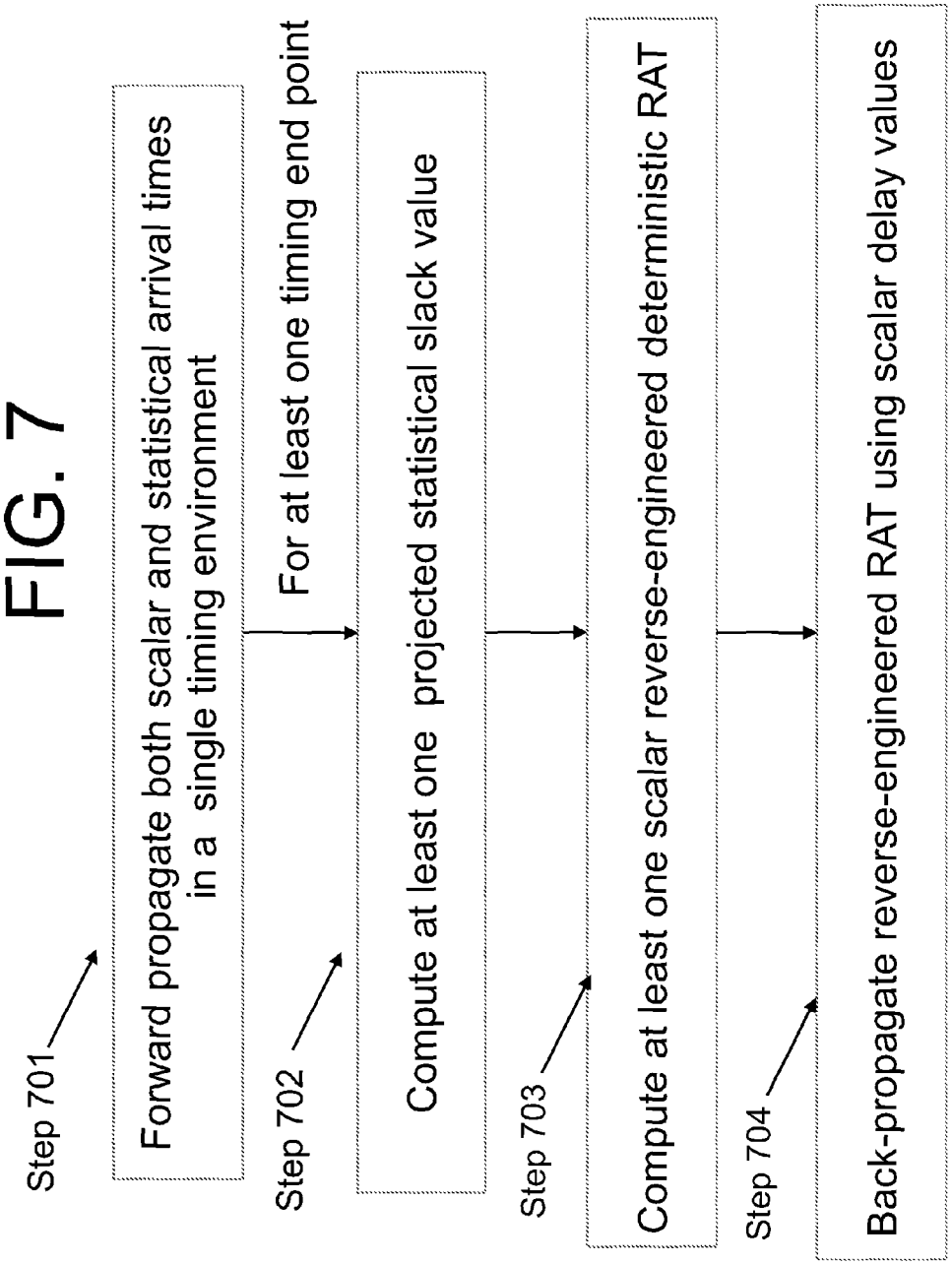
FIG. 7 shows a flowchart illustrating an embodiment of the present application.
Figure 8:
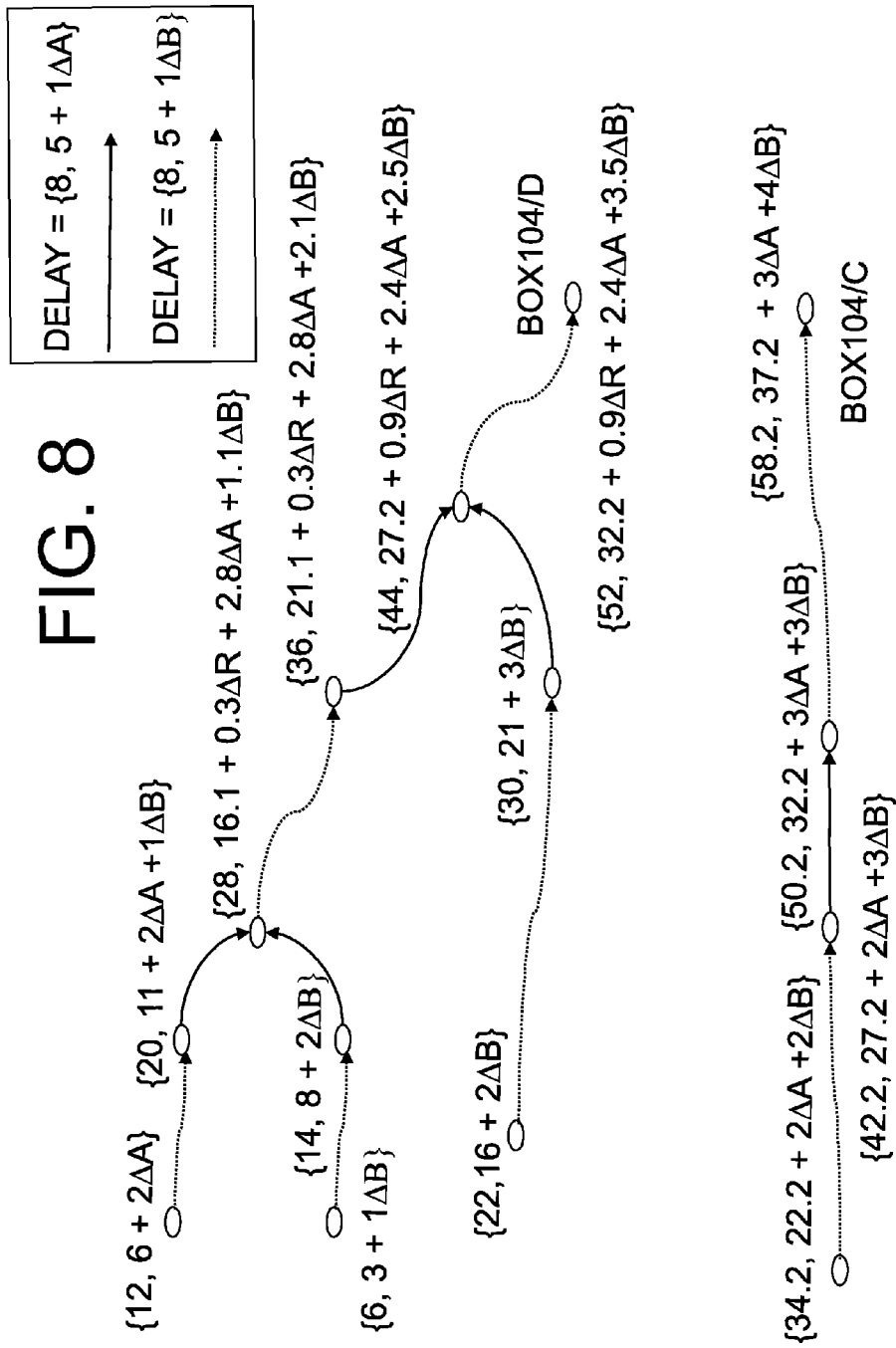
FIG. 8 illustrates simultaneous forward-propagation of both scalar and statistical arrival times in accordance with an embodiment.

FIG. 7 shows a flowchart illustrating an embodiment of the present application. In accordance with Step 701 of FIG. 7, FIG. 8 depicts a simultaneous propagation of both statistical and scalar (i.e., single corner) arrival times for the aforementioned exemplary circuit. For purposes of illustration, it assumes that scalar delays are computed at a +3sigma corner relative to underlying sources of variation which can impact delay (i.e., in the example, $\Delta A$, $\Delta B$, and $\Delta R$. Propagation of the scalar and statistical timing quantities occurs in single timing graph representing the underlying circuit, such that both can simultaneously respond to design updates.

Based on the computed arrival times, a statistical slack value is computed at setup test which in the exemplary circuit involves comparing data signal at timing graph node BOX104/D with the clock signal at the timing graph node BOX104/C. For illustrative purposes, it is assumed that the aforementioned setup test has zero guard time and zero cycle adjust, though embodiments of the present application accommodate any non-zero values of such by plugging in to the appropriate slack equations.

Given the corresponding statistical arrival times shown in FIG. 8, a statistical setup slack can be computed as:

STATISTICAL SLACK=AT(CLOCK)−SETUP_TIME−AT(DATA)+CYCLE ADJUST={37.2+ 3$\Delta A$+4$\Delta B$}−0−{32.2+0.9$\Delta R$+2.4$\Delta A$+3.5$\Delta B$}+ 0={5+0.9$\Delta R$+0.6$\Delta A$+0.5$\Delta B$}

In accordance with FIG. 7, Step 702, a statistical slack value is projected. For purposes of illustration, a 3-sigma worst-corner projection is used, which indicates that each source of variation is independently projected to either a +3 or −3sigma value, in which each direction minimizes the resulting projected slack. The resulting projected slack value is computed as follows:

Projected 3-sigma worst corner statistical slack: 5−3* (0.9+0.6+0.5)=5=−3*2=−1

One embodiment encompasses any means of projecting slack to a scalar value, including projections to any sigma value, as well as a root-sum-square projection across any subset of parameters.

In accordance with FIG. 7, Step 703, a scalar required arrival time is reverse-engineered at BOX104/D such that the resulting scalar slack is representative of the projected 3-sigma worst corner slack shown above, wherein in late mode, SLACK=RAT−AT. Therefore, RAT (late)=SLACK+ AT Based on the previously described, the projected 3-sigma worst-corner statistical slack is −1 and the scalar AT is 52 (See FIG. 9). Therefore, RAT (BOX104/D, Scalar reverse-engineered)=−1+52=51.

Figure 9:
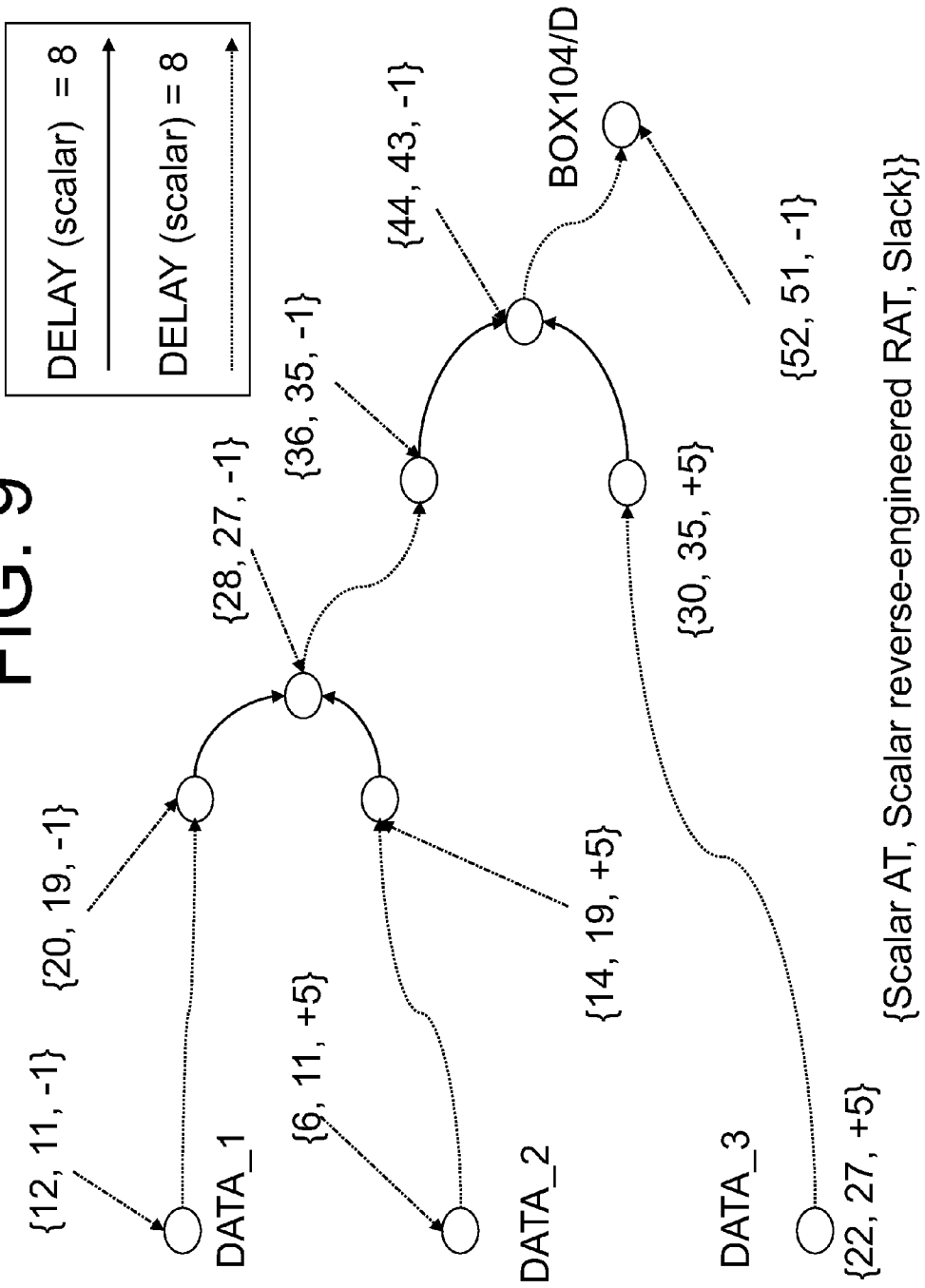
FIG. 9 illustrates an embodiment of a back-propagation of a reverse-engineered required arrival time in accordance with an embodiment.

In accordance with FIG. 7 Step 704, the above reverse-engineered RAT is then back-propagated using scalar delay values, producing RATs and corresponding reverse-engineered scalar slacks (i.e., slacks computed based on comparing back-propagated reverse-engineered RATs against corresponding propagated scalar ATs), as shown in FIG. 9.

Although the aforementioned example focused on late mode arrival time and RAT propagation, embodiments of the present disclosure encompass all manner of propagation including both EARLY and LATE mode analysis, and separate propagation for RISE versus FALL transitions, as well as separate propagations per clock domain.

Figure 10:
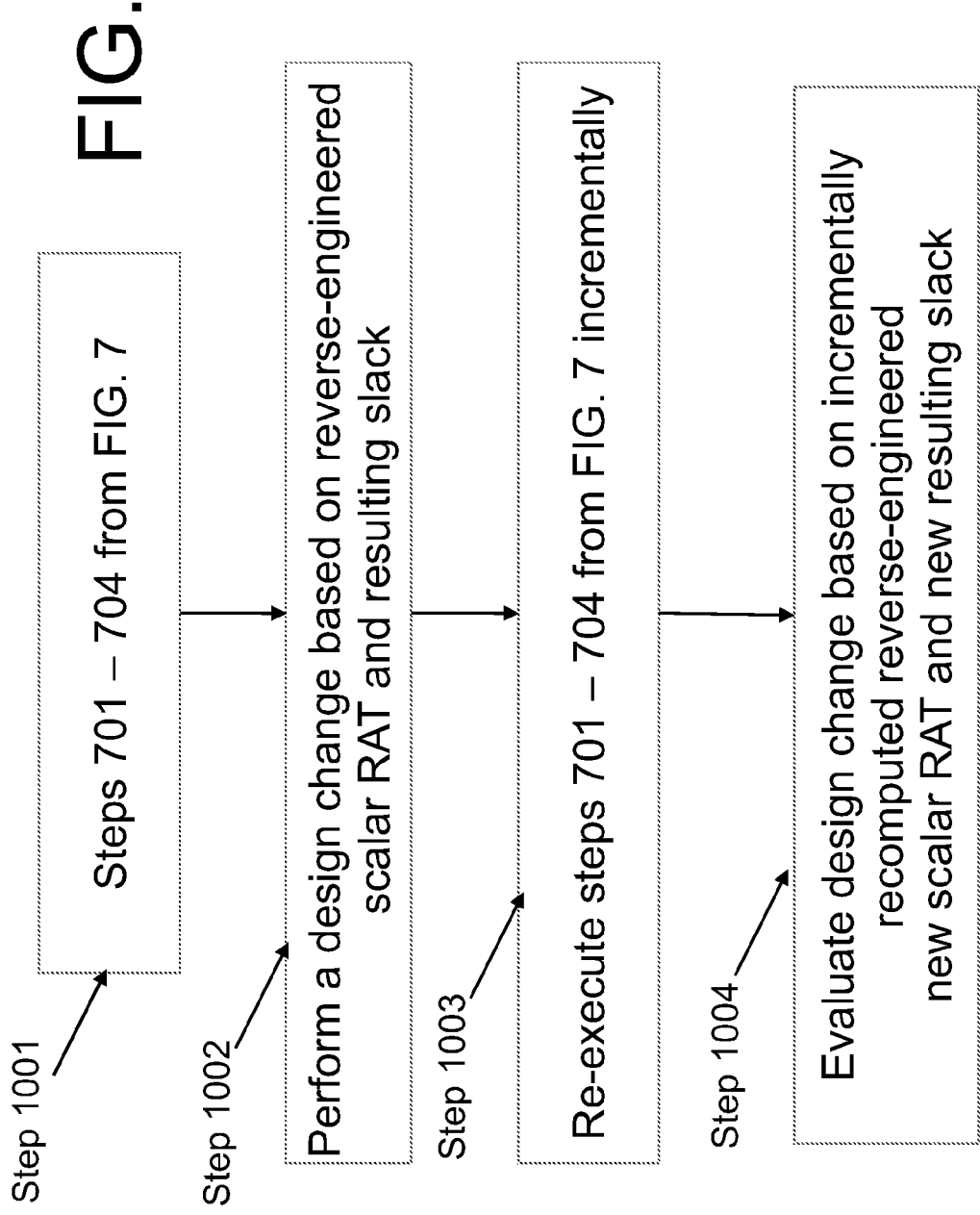
FIG. 10 shows a flowchart according to an embodiment of the present application.

FIG. 10 illustrates another embodiment, wherein in FIG. 10, Step 1001, an initial propagation of scalar reverse-engineered required arrival times occurs in accordance with FIG. 7, Steps 701-704, and wherein FIG. 10, Step 1002 involves making at least a design change based on reverse-engineered scalar RAT values.

Figure 11:
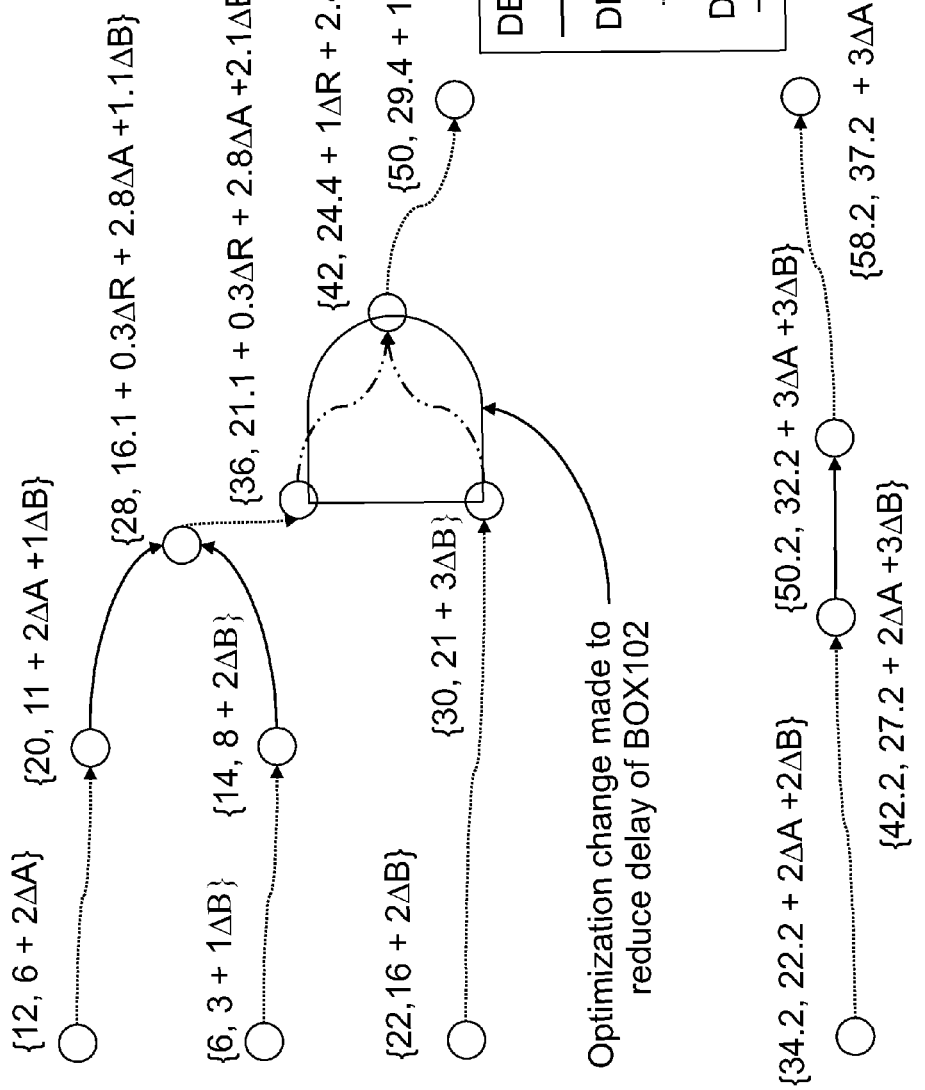
FIG. 11 depicts a design change and subsequent incremental propagation of both scalar and statistical arrival times, in accordance with an embodiment.

Referring to FIG. 11, an optimization program modified late mode timing (i.e., reduced delay) on BOX102, based upon encountering negative reverse-engineered scalar slack (−1) at BOX102/A, and making a change reducing the delays of the cell.

Still referring to FIG. 11, it is assumed that an optimization transform has been made to reduce delays through BOX102, such that the new statistical delay for BOX102 is 3+1$\Delta A$ (whereas original values of the cell were 5+1$\Delta A$.)

Still referring back to FIG. 10, Step 1003, the following values are incrementally recalculated:

i) Both statistical and scalar arrival times are incrementally re-computed and forward propagated (i.e., FIG. 7, Step 701 is incrementally re-executed by propagating at least one new statistical arrival time, and corresponding scalar arrival time, in response to a design change), with the resulting arrival time values shown in FIG. 11.

ii) A statistical slack is incrementally re-computed at BOX104/D, in the example:

STATISTICAL SLACK=AT(CLOCK)−SETUP_TIME−AT(DATA)+CYCLE ADJUST={37.2+ 3$\Delta A$+4$\Delta B$}−0−{29.4+1$\Delta R$+2.4$\Delta A$+3$\Delta B$}+0=7.8+ 1$\Delta R$+0.6$\Delta A$+1$\Delta B$.

The above statistical slack is then projected to (i.e., FIG. 7, Step 702, which is incrementally re-executed by re-computing slacks for at least one timing test where an arrival time value has changed in response to a design change). In the example, a 3-sigma worst-corner projection is assumed, as previously described. As a result, the projected slack=7.8−3* (1+0.6+1)=7.8−3*2.6=0.

A new scalar required arrival time is reverse-engineered (i.e., FIG. 7, Step 703 is incrementally re-executed by performing a slack projection for at least one timing test where a statistical slack has changed in response to a design change). In accordance with the aforementioned description, RAT (late)=SLACK+AT. Therefore, RAT (BOX104/D, Scalar reverse-engineered)=0+50=50.

The above reverse-engineered scalar RAT is then back-propagated with resulting values shown in FIG. 11, (i.e., FIG. 7, Step 704 is incrementally re-executed, by backward propagating reverse-engineered RAT from at least one test for which a reverse-engineered RAT has been re-computed in response to the design change).

Figure 12:
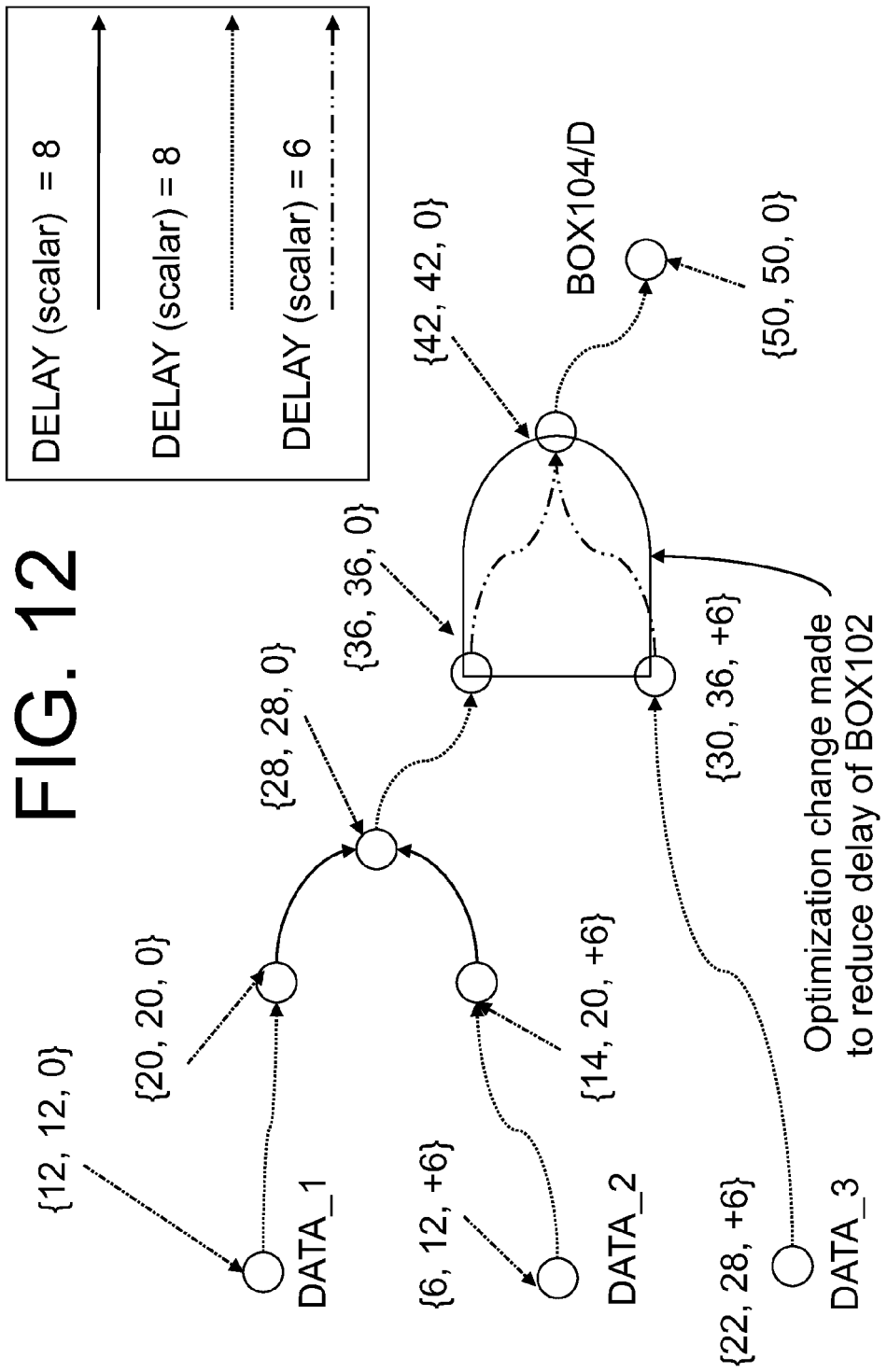
FIG. 12 illustrates incremental back-propagation of a new reverse-engineered scalar required arrival time, in accordance with an embodiment.

Finally, in accordance with FIG. 10 Step 1004, the design change is evaluated based on the above incrementally re-computed reverse-engineered scalar required arrival time values. In the example shown in FIG. 12, a scalar reverse-engineered required arrival time of 36 is propagated to both "A" and "B" inputs of BOX102, resulting in a reverse-engineered scalar slack (i.e., slack computed comparing a scalar AT against a back-propagated reverse-engineered RAT) of 0 at BOX102/A input and 6 at BOX102/B. Since the resulting reverse-engineered scalar slack is non-negative, the optimization program can then decide whether to accept the change. Alternatively, the optimization program can try subsequent fixes to further reduce the delay of BOX102, and select from among the based on the solution which maximizes the resulting incrementally re-computed reverse-engineered slack value.

The present application can be realized in hardware, software, or a combination of hardware and software. The present application can further be realized in a centralized fashion in one computer system or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

Embodiments of the disclosure can be embedded in a computer program product, which includes all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

While the present application has been particularly described as a simple illustrative embodiment, it is to be understood that one of ordinary skill in the art can extend and apply the application in many obvious ways. In the embodiments described herein, for purposes of clarity, rising and falling timing quantities were not differentiated, but one of ordinary skill in the art could apply the present application to a situation with different rising and falling delays, slews, ATs and RATs. Embodiments of the application apply to any type of static timing analysis, including but are not limited to, transistor-level circuits, hierarchical circuits, circuits with combinational logic, circuits with sequential logic, timing in the presence of coupling noise, timing in the presence of multiple-input switching, timing in the presence of arbitrary timing tests such as setup, hold, end-of-cycle, pulse width, clock gating and loop-cut tests, and timing in the presence of multiple clock domains. Embodiments of the application further apply to any form of statistical projection in order to compute a scalar slack quantity. It is also evident that many alternatives, modifications and variations will be apparent to those skilled in the art in light of the present description. It is therefore contemplated that the appended claims will embrace any such alternatives, modifications and variations as falling within the true scope and spirit of the present application.

What is claimed is:

1. A method of maintaining slack continuity in incremental statistical timing analysis of a circuit design, comprising:
   a. using a computer, forward propagating both deterministic scalar and statistical arrival times in a single timing environment;
   b. computing for at least one timing end point at least one projected statistical slack value;
   c. computing at least one deterministic scalar reverse engineered required arrival time from said at least one projected statistical slack value;
   d. back propagating said deterministic scalar reverse engineered required arrival time using deterministic scalar delay values, and measuring a resulting slack;
   e. performing a redesign of the circuit design based on said reverse engineered deterministic scalar required arrival time and resulting slack;
   f. incrementally re-executing steps a. to e. to re-compute a new deterministic scalar reverse-engineered required arrival time and a new resulting slack;
   g. propagating the new deterministic scalar reverse-engineered required arrival time and the new resulting slack to a deterministic timing graph in the single timing environment; and
   h. implementing the circuit design into a digital integrated circuit.

2. The method of claim 1 further comprising evaluating said redesign based on said incrementally re-computed new reverse-engineered deterministic scalar required arrival time and new resulting slack.

3. The method of claim 1 further comprising applying to timing different rising and falling delays, slews, arrival times (ATs) and required applied times (RATs), and any combination thereof.

4. The method of claim 1 further comprising transistor level circuits, hierarchical circuits, circuits including combinational logic, circuits having sequential logic, timing in presence of coupling noise, timing in the presence of multiple-input switching, and any combination thereof.

5. The method of claim 4 further comprising circuits containing timing tests comprising set-up, hold, end-of-cycle, pulse width, clock gating and loop-cut tests.

6. The method of claim 1, wherein statistical timing runs are applied in multiple clock domains.

7. The method of claim 1, wherein said at least one deterministic scalar projected statistical slack value is computed based on at least one of worst-case projection, root-sum-square projection, and any combination thereof.

8. A non-transitory storage device readable by a machine for maintaining slack continuity in incremental statistical timing analysis of a circuit design, including instructions that when executed by the machine perform a method comprising:
   a. using a computer, forward propagating both deterministic scalar and statistical arrival times in a single timing environment;
   b. computing for at least one timing end point at least one projected statistical slack value;
   c. computing at least one deterministic scalar reverse engineered required arrival time from said at least one projected statistical slack value;
   d. back propagating said scalar reverse engineered required statistical arrival time using deterministic scalar delay values from said at least one timing end point;
   e. performing a redesign of the circuit design based on said reverse engineered required arrival time and resulting slack;
   f. incrementally re-executing, steps a. to d. to re-compute new reverse-engineered required arrival time and a new resulting slack;
   g. propagating the new deterministic scalar reverse-engineered required arrival time and the new resulting slack to a deterministic timing graph in the single timing environment; and
   h. implementing the circuit design into a digital integrated circuit.

9. A method for performing an incremental statistical timing analysis of a digital integrated circuit wherein in response to an incremental change comprising;
   a. using a computer, determining deterministic scalar arrival times forward propagated in a timing environment, and b. determining statistical arrival times forward propagated in the timing environment;

c. computing for at least one timing end point, at least one statistical slack value projected to a deterministic scalar value;

d. incrementally transferring the deterministic scalar value to a deterministic timing graph;

e. from said at least one deterministic scalar slack value, computing at least one deterministic reverse-engineered required arrival time (RAT), wherein when compared against a corresponding deterministic arrival time (AT), producing a deterministic slack representative of at least one projected statistical slack value and transferring the deterministic slack to a deterministic timing graph;

f. performing a design change to the digital integrated circuit; and g. implementing the design change into the digital integrated circuit.

10. The method of claim 9, further comprising back propagating from said at least one timing end point said deterministic reverse-engineered RAT using deterministic delay values.

11. The method of claim 10 wherein the design change to the digital integrated circuit is made based on querying at least one of said back propagated reverse engineered RAT, and deterministic slack resulting thereof.

12. The method of claim 11, further comprising repeating said step a. but not repeating steps b. through d., and maintaining a delta list of accumulated incremental changes followed by performing at least one second design change to the digital integrated circuit after which steps a. through d. are repeated, and wherein said delta list is processed in order to invalidate statistical timing data.

13. The method of claim 9, further comprising, repeating step a. and not repeating steps b. through d.; and performing at least one second design change to the digital integrated circuit after which steps a. through d. are all repeated.

* * * * *